Patented Sept. 24, 1929

1,729,006

UNITED STATES PATENT OFFICE

PAUL NAWIASKY AND EMIL KRAUCH, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

NEW VAT DYESTUFF

No Drawing. Application filed June 18, 1927, Serial No. 199,863, and in Germany June 22, 1926.

It is already known that, by treating hydroxy-derivatives of ketones of the perylene series with alkylating agents, vat dyestuffs are obtained which, however, generally speaking do not possess very good properties as regards fastness and especially fastness to light, unless the alkyl groups have only a short chain of carbon atoms.

We have now found that long-chain derivatives also possess excellent properties as regards fastness provided they contain a short chain alkyl group containing not more than 4 carbon atoms in the chain to which a further hydrocarbon radicle is linked by means of an oxygen or a sulfur atom in sulfid form. The new dyestuffs may be produced according to this invention, for example, by bringing the hydroxy-derivatives of dibenzanthrones or iso-dibenzanthrones hereinafter referred to collectively for the sake of brevity as dibenzanthrones into reaction with arylsulfonic-acid esters of alkyl-, aryl- or aralkyl ethers of di- or trivalent alcohols, or thioalcohols. The derivatives of ethylene glycol are particularly suitable, but those for example of propylene or butylene or other glycols or of glycerol or other polyvalent alcohols or thioalcohols may also be employed. In addition to their excellent fastness to light, the resulting dyestuffs are distinguished by a remarkably high solubility in organic solvents, such as has hitherto been scarcely known in the case of such high-molecular products. This ready solubility renders the new dyestuffs excellently suitable for example for the production of colored lacquers. The new products obtained by the condensation of hydroxy-derivatives of the ketones of the perylene series with toluene sulfonic acid esters of monoalkyl ethers of ethyleneglycol have been found particularly useful.

The following examples will further illustrate how the said invention may be carried into practical effect but the invention is not limited to these examples. The parts are by weight.

Example 1

10 parts of the reduced oxidation obtained from dibenzanthrone according to Example 3 of the specification of Letters Patent No. 1,093,427 are heated to boiling for 3 hours with 10 parts of glycol-mono-methyl-ether-toluenesulfonate and 10 parts of sodium carbonate in 150 parts of trichlorbenzene. Another 5 parts of the ester and 5 parts of sodium carbonate are then added, and boiling is continued for another 3 hours under a reflux condenser. The whole is then allowed to cool slightly and the reaction mixture is subjected to steam distillation. The residue is purified by dissolving it in hot trichlorbenzene, and filtering. After concentration, the dyestuff crystallizes out from the trichlorbenzene solution on cooling. It gives fast blue-green dyeings on cotton from a blue vat.

The reaction may be illustrated by the following equation:

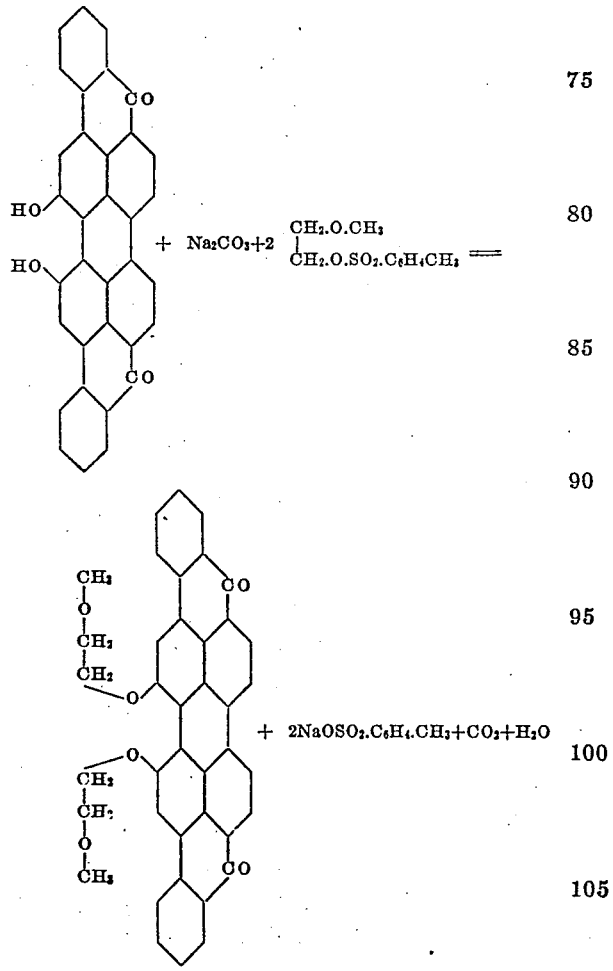

A similar dyestuff is obtained with glycol-mono-ethyl-ether-toluene-sulfonate.

Example 2

10 parts of the oxidation product of dibenzanthrone employed in Example 1 are boiled for 3 hours under a reflux condenser with 10 parts of glycol-mono-n-butyl-ether-toluene-sulfonate and 10 parts of sodium carbonate in 150 parts of trichlorbenzene, after which another 10 parts of the said ester and 10 parts of sodium carbonate are added, and the heating is continued for 3 hours longer, under a reflux condenser, at boiling temperature. The further treatment is carried out in the manner described in Example 1.

The reaction may be illustrated by the following equation:

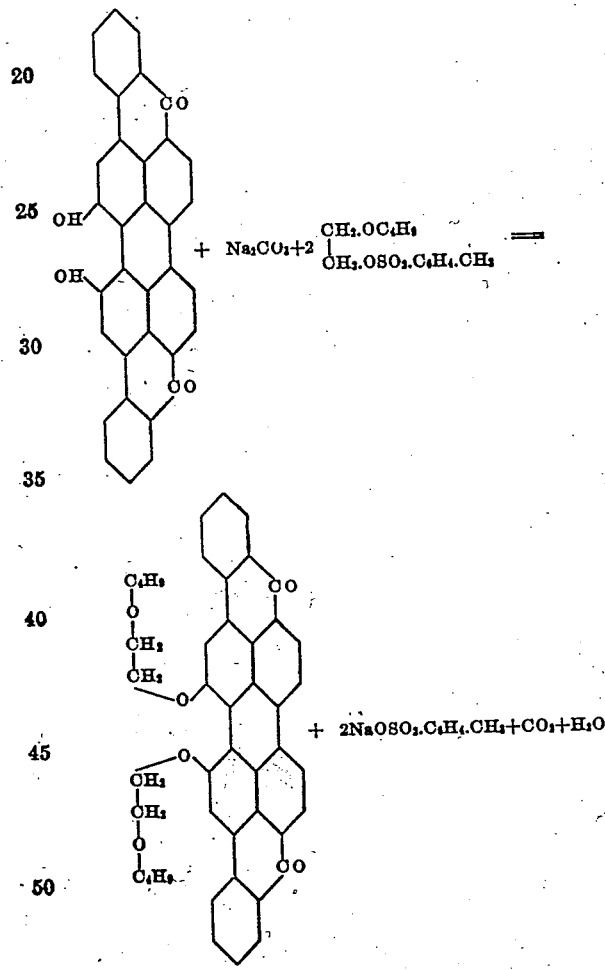

The new dyestuff is a dark powder of metallic lustre, which dissolves with comparative ease in benzene, and other organic solvents of low boiling point. A cellulose nitrate lacquer stained with the dyestuff furnishes green coatings of a fastness hitherto unattainable with other green dyestuffs for cellulose nitrate lacquers.

If the glycol-butyl-ether-toluenesulfonate used for the alkylating treatment contains glycol-ditoluenesulfonate there is obtained, as a by-product, a blue dyestuff, which can also be obtained from ethylene bromide and dihydroxydibenzanthrone. In this case, the new dyestuff can be separated from the sparingly soluble blue dyestuff, for example by boiling with monochlorbenzene or butyl acetate.

What we claim is:

1. As new articles of manufacture, ethers of hydroxy-derivatives of dibenzanthrones in which the hydroxyl groups are etherified with a short chain alkyl group containing at the most 4 carbon atoms in the chain to which a further hydrocarbon radicle is linked by means of an atom selected from the group consisting of oxygen and sulfur in sulfid form.

2. As new articles of manufacture, ethers of dihydroxy-dibenzanthrone in which the hydroxyl groups are etherified with a short chain alkyl group containing at the most 4 carbon atoms in the chain to which a further hydrocarbon radicle is linked by means of an atom selected from the group consisting of oxygen and sulfur in sulfid form.

3. As new article of manufacture, an ether of dihydroxy-dibenzanthrone in which the hydrogen atoms of the hydroxyl groups are replaced by the group $-CH_2-CH_2-O-CH_2-CH_2-CH_2-CH_3$, which product forms a dark powder of metallic lustre, is soluble in organic solvents of low boiling point and dissolves to a green solution in cellulose nitrate lacquers.

4. The process of producing new vat dyestuffs which consists in etherifying hydroxy-derivatives of dibenzanthrones with a short chain alkyl group containing at the most 4 carbon atoms in the chain to which a further hydrocarbon radicle is linked by means of an atom selected from the group consisting of oxygen and sulfur in sulfid form.

5. The process of producing new vat dyestuffs which consists in etherifying hydroxy-derivatives of dibenzanthrones with an aryl-sulfonic acid ester of an ether of a polyvalent alcohol which is at the most trivalent.

6. The process of producing new vat dyestuffs which consists in etherifying dihydroxy-dibenzanthrone with an aryl-sulfonic acid ester of an ether of a polyvalent alcohol which is at the most trivalent.

7. The process of producing new vat dyestuffs which consists in etherifying dihydroxy-dibenzanthrone with an aryl-sulfonic acid ester of a mono-alkyl ether of ethylene glycol.

In testimony whereof we have hereunto set our hands.

PAUL NAWIASKY.
EMIL KRAUCH.

CERTIFICATE OF CORRECTION.

Patent No. 1,729,006. Granted September 24, 1929, to

PAUL NAWIASKY ET AL.

It is hereby certified that error appears in the printed specification of the above numbered patent requiring correction as follows: Page 1, line 51, after the word "oxidation" insert the word "product"; and that the said Letters Patent should be read with this correction therein that the same may conform to the record of the case in the Patent Office.

Signed and sealed this 15th day of October, A. D. 1929.

(Seal)

M. J. Moore,
Acting Commissioner of Patents.